Oct. 21, 1969  G. I. DOERING  3,474,160
METHOD AND APPARATUS FOR CONTROLLING BLOWN FILM EXTRUDER
Filed April 27, 1965  4 Sheets-Sheet 1

GEORGE I. DOERING
INVENTOR.

BY
James J. O'Reilly
AGENT

GEORGE I. DOERING
INVENTOR.

BY
James J. O'Reilly
AGENT

United States Patent Office 3,474,160
Patented Oct. 21, 1969

3,474,160
METHOD AND APPARATUS FOR CONTROLLING BLOWN FILM EXTRUDER
George I. Doering, Columbus, Ohio, assignor to Industrial Nucleonics Corporation, a corporation of Ohio
Filed Apr. 27, 1965, Ser. No. 451,231
Int. Cl. B29d 7/16; G01t 1/16
U.S. Cl. 264—40
35 Claims

ABSTRACT OF THE DISCLOSURE

A method and apparatus for measuring the thickness profile of a flattened, double thickness sheet of plastic extruded by a blown film extruder having a rotating component to distribute thickness variations circumferentially about the sheet includes a gauge which scans the sheet at a rate such that the gauge moves across the sheet at the same speed as the thickness variations on one half of the sheet move to prevent relative motion with respect to the variations in said one half of the sheet and to permit scanning of the remainder of the sheet for variations in thickness. The average sheet thickness is determined by continuously measuring the thickness of the sheet by one or more gauges which divide the perimeter of the sheet into equal sections, and averaging the measurement over the period of time required for the variations in one perimeter section to move past the gauge.

---

This invention relates generally to plastic film extrusion processes of the blown film rotating element type and more particularly to improved method and means for measuring and controlling the rotating variations in a characteristic property, such as thickness, of the film produced by these processes.

In recent years, the thin film production in this country has increased many times to keep pace with the ever-expanding consumer market for thin film products such as those used to wrap foods for refrigerator storage. The plastics industry has been able to meet the demand largely through the use of improved extrusion equipment. One of these types is the screw extruder that extrudes the melted plastic through a circular die. A stream of air is forced through the center of the die to expand and orient the film into a large bubble and an annular air ring is sometimes mounted after the die to cool the expanding bubble. In certain cases heat is added to the material to aid the orientation process. The die, air ring and/or heat source may have a plurality of peripheral adjustments which effect the local thickness of the bubble. Air is trapped within the bubble by rolls that flatten the bubble into a sheet of double thickness. Heavy or light streaks inevitably appear that would normally, in linear die extruders, run lengthwise of the extruded sheet. When the sheet is wound upon a reel, it does not take many layers before hard or soft spots appear making an unsatisfactory roll. This effect has been virtually eliminated by rotating elements relative to the windup. By rotating one or more elements of the extruder relative to the winder any thickness defects spiral around the bubble and may be spread crosswise in the final sheet. To accomplish this effect, either the air ring alone or with the die, or the entire extruder itself, may be rotated at angular speeds of up to approximately one revolution per minute.

While this mechanical approach to extruding plastic has improved not only the operation of these processes but the quality of their product as well, it poses certain challenges to systems that might be employed to control them. It is desired that the extruded film have certain properties such as a nominal thickness. Thickness control must be based, of course, on a thickness measurement by a transducer measuring either the bubble or the flattened sheet. Both the thickness profile, i.e., the thickness variations around the bubble, and the average thickness of the bubble should be controlled. Usually, thickness measurement of the bubble itself has been considered impractical. Regardless of the type of thickness measurement, profile or average, the spiralling thickness variations caused by the rotating die members make the measurement extremely difficult. The problem of determining profile is made even more difficult when both the air ring and the die are rotated.

To determine profile it has been proposed to slit the edges of the flattened sheet and scan each side with a thickness gauge. If one side is measured while scanning in one direction and the other side is measured during a return scan, continuous recording of one gauge and then the other provides a readout of thickness in terms of the cross-sheet dimension of the sheet. This system is disclosed and claimed in a copending application Ser. No. 448,995, filed Apr. 19, 1965, now Patent No. 3,396,219, by Gerald Sutterfield and Edward Amberg and assigned to the same assignee as the present invention.

Alternatively, one gauge has been positioned at the vary edge of the sheet. As the sheet travels by the stationary gauge, the rotating thickness variations in the sheet pass under the gauge. In one cycle of the rotating die member, all of the rotating variations are effectively scanned by the gauge. While both thicknesses of the sheet are measured, since the measured areas are located at the edge of the sheet, they have substantially the same thickness value. This system is disclosed and claimed in a copending application Ser. No. 309,631, filed Sept. 18, 1963, by William H. Palmer and assigned to the same assignee as the present invention, now Patent No. 3,368,007.

To determine the average thickness of the sheet the Palmer application, supra, suggests integrating the edge-of-the-sheet measurement over one complete cycle of the rotating die member. Since all of the rotating variations are seen by the gauge in this time, an average calculated on this time base provides a more accurate or truer indication of sheet average thickness.

I propose to measure both the profile and the average thickness of the extruded sheet to obtain an accurate representation of how the extruder is operating and to provide a control system responsive to these measurements for the purpose of maintaining a degree of thickness uniformity heretofore unheard of.

To determine profile, I measure the double thickness of the sheet with a guage that I move across the sheet at the same speed as the thickness variations. The gauge measures an area on one side of the sheet, or the other, that moves with the gauge. Since the thickness of this area remains substantially constant, the only rotating variations in thickness that are measurable are those occurring in the other side of the sheet. It can be seen that, of the two sheet areas being concomitantly measured by my gauge, one on the top half and one on the bottom half, only the area on the side of the sheet that moves relative to my gauge will cause a change in gauge response. Therefore, my gauge effectively scans the side of the sheet moving in the opposite direction of my gauge. To measure all the variations occurring in the sheet, I follow the area completely across the sheet. In specific embodiments of my invention, I measure the width of the sheet and control the scanning speed of my gauge to maintain it in synchronism with the rotating variations. The profile output of my gauge may be read out or utilized for purposes of controlling the extruder. If both die elements are rotated, air ring profile can be determined by stopping the die and scanning the sheet.

For some purposes, such as process control, it is more desirable to know the average thickness of the sheet. It is further desirable to compute this average in the shortest possible time. To accomplish these objectives, I position one or more gauges across the width of the sheet. Each gauge measures a selected portion or fraction of the perimeter of the sheet as the thickness variations rotate. I combine and integrate the measurements of each gauge over a time period which is a corresponding fraction of the time required for one revolution or cycle of the air ring or die members. As a specific example, I position one gauge substantially in the middle of the sheet to divide the perimeter in half. Since I measure the double thickness of the sheet, I see all the variations therein during one-half of the die rotation cycle. Therefore, by integrating the measurements of my center-of-the-sheet gauge over this period of time, I obtain a true average thickness of the sheet computed in one-half of the time required by other systems. Of course, I may average over a period of time that is an integral multiple of one-half of the die rotation cycle, but little additional thickness data is provided if the thickness variations spiraling around the sheet do not change much in the machine direction, as will usually be the case. I utilize the computed average thickness to control either the speed of the extruder screw or the speed at which the sheet is drawn away from the extruder. If the average thickness becomes greater than some desired or target value, I increase the take-away speed to reduce the overall sheet thickness. A change in average sheet thickness in the opposite direction is compensated by decreasing the take-away speed. My method and apparatus significantly reduces the amount of undesirable throughput by providing a control signal much faster than systems currently in use.

In some applications, where the die is not rotated, it may become cocked and produce stationary thickness bands that extend longitudinally of the sheet. I detect the presence of these bands by measuring the total profile with my scanning gauge and then measuring the rotating profile at the edge of the sheet in the manner of Palmer supra. Any difference in the two measurements indicates a stationary or nonspiraling gauge band.

Accordingly, it is a primary object of my invention to provide an improved property measuring and control system for a tubular product line.

It is another object of my invention to provide a faster thickness averaging system for a blown plastic film process.

It is also an object of my invention to provide a blown film thickness profile gauge that has a higher resolution than similar devices used heretofore.

It is yet another object of my invention to provide a measuring and control system that significantly increases the desirable throughput of a blown film process.

It is an additional object of my invention to provide a blown film measuring and control system that is cheaper to construct and easier to maintain than similar devices used heretofore.

It is still another object of my invention to provide a system for determining the presence of nonrotating thickness bands.

These objects and other advantages will become more apparent upon reference to the following description when taken in conjunction with the attached drawings, in which.

Figure 1:
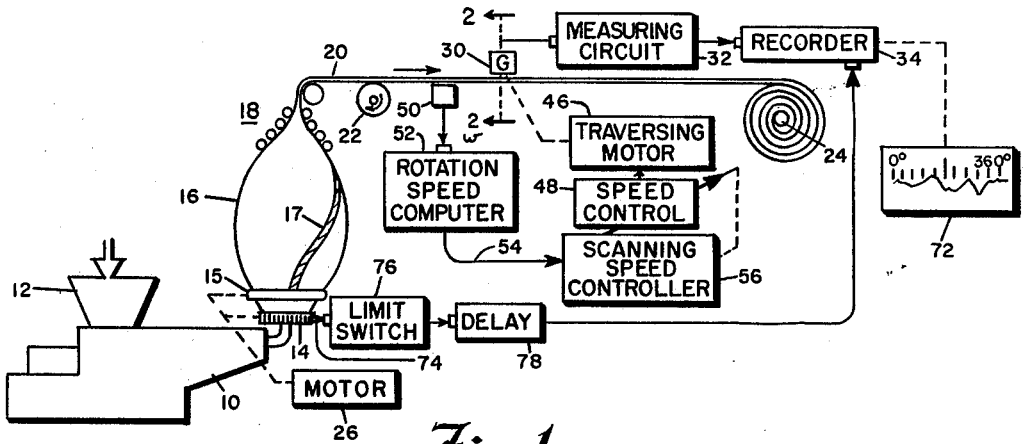
FIGURE 1 is a diagrammatic view of a blown film line measured in accordance with one embodiment of my invention.

With reference to the drawings, and particularly to FIG. 1, I have illustrated my invention in connection with a blown film extrusion process but it may, of course, be used to measure other tubular products that are flattened to produce a sheet of double thickness.

In this embodiment, an extruder 10 receives plastic ingredients fed into a hopper 12 and forces liquidous or molten plastic out of an annular rotatable die member 14. A rotatable air ring 15 may be mounted after the die 14. Air is forced into the center of the die 14 to expand the extruded plastic into a large bubble 16. A number of rollers 18 squeeze the bubble 16 and flatten it into a sheet 20 of double thickness. A driven take-away conveyor roll 22 draws the sheet away from the extruder 10. The sheet 20 is wound upon a reel 24.

To spread variations laterally across the sheet and to prevent "high" spots from building up on the reel 24, the bubble 16 may be oscillated slowly relative to the extruder 10. The extruder itself may be rotated about the windup or, alternatively, the extruder may be fixed and a motor 26 may be employed to rotate the die 14 or air ring 15 relative to the extruder 10. Angular velocities of ⅛ revolution per minute to one revolution per minute are commonly employed. In some applications, any of these elements may be counterrotated through some angle less than 360°. The die 14 has a plurality of separately adjustable lip segments located around the periphery thereof that control the thickness at their respective locations. If any of these adjustments slip for any reason or if any of the cooling jets of the air ring 15 become clogged, a thick streak will appear as illustrated by the shaded area 17 of the bubble 16. The streak spirals around the bubble 16 due to the combined effects of take-away and die rotation movements.

CONSTRUCTION OF MY PROFILE CONTROL EMBODIMENT

To detect this streak and others that may exist, I position a thickness gauge 30 adjacent to the flattened sheet 20. The gauge 30 responds to the combined thickness of both lays or thicknesses of the sheet 20 and it may be any of the infrared, ultraviolet, acoustic or other type. The double thickness signal from the gauge 30 is transmitted to a measuring circuit 32 that amplifies it. A recorder 34 serves to graphically record the amplified signals.

Figure 2:
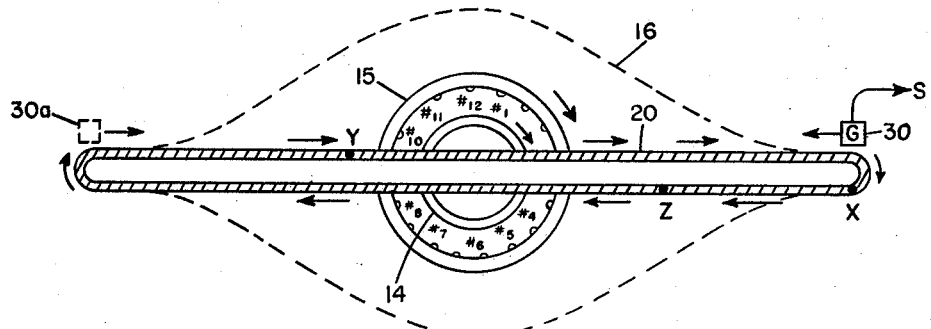
FIGURE 2 is an enlarged sectional view taken on the line 2—2 of FIG. 1.
Figure 3:
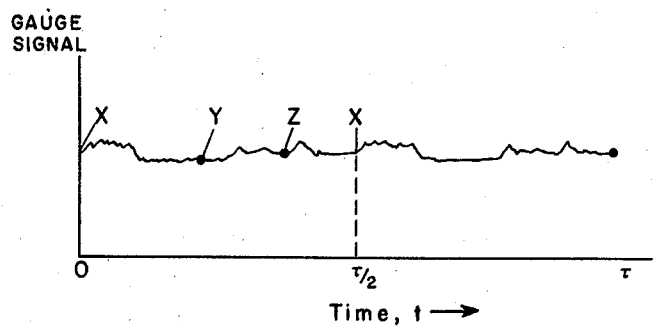
FIGURE 3 is a graph illustrating the time response of my gauging system.

Referring briefly to FIG. 2, three sheet areas, represented by points X, Y, and Z in the sheet 20 are selected to illustrate the rotating nature of the thickness bands and how I propose to measure them. The thickness variations at each of these points may be affected by either the air ring 15 or the die 14. If successive sections are taken at this point in the process, each of the points X, Y, and Z would appear to rotate in a clockwise direction around the cross-section. I propose to scan across the sheet at the speed of these rotating variations. Gauge 30 is thus continuously positioned over one area of the sheet, say point X, and it follows this area to the opposite side of the sheet to position 30a. It can be seen that the signal from gauge 30 will be a function of the combined thickness of the sheet at point X and those areas of the sheet which pass above this continuously scanned area. Since the thickness at X will remain substantially invariant for several revolutions of the die 14 and air ring 15, and since the entire sheet is scanned by the gauge 30, any variations in the signal from the gauge 30 will result solely from the thickness variations existing around the sheet 20. For example, if the period of rotation is $\tau$ seconds, the thickness profile will be measured in $\tau/2$ seconds. A return scan will yield a redundant profile that may be seen graphically in FIG. 3.

Figure 4:
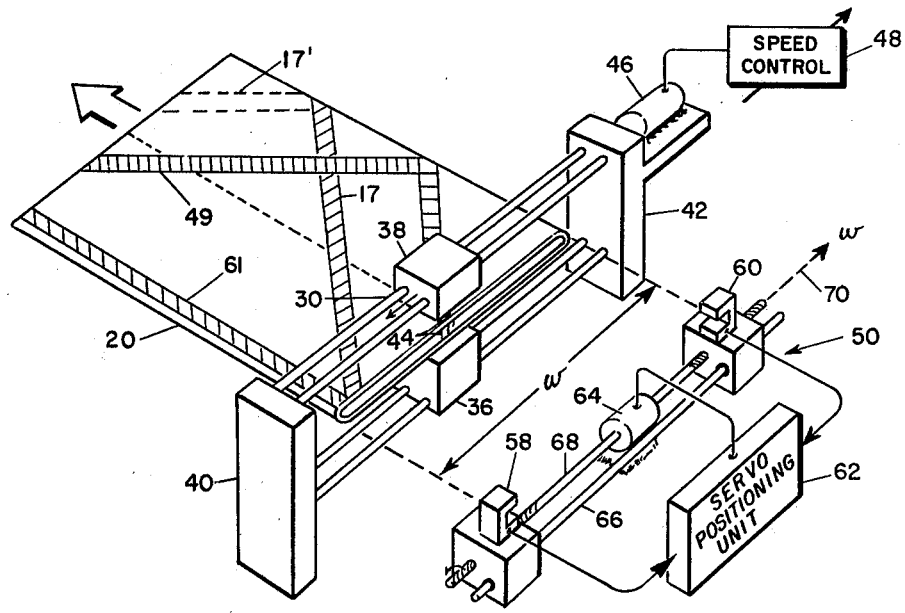
FIGURE 4 is a perspective view showing my preferred sheet thickness gauging and scanning apparatuses.

FIGURE 4 provides an excellent view of how the rotating variations are distributed down the sheet 20 and how my system resolves them. Looking downstream toward the windup reel 24, one would observe the heavy or thick streak 17 travelling slant-wise from left-to-right, around the far edge of the sheet 20 and then back to the other edge along the bottom lay as represented by the dotted lines 17. My gauge 30 preferably comprises a radiation thickness gauge having a lower source housing 36 and an upper detector housing 38 each mounted in vertical alignment on a pair of traversing rods extending between a pair of upstanding mounting brackets 40 and 42. A beam of radiation 44 is passed upwardly through the sheet 20 to strike detectors located in the housing 38. The amount of radiation passing through the sheet is inversely proportional to the combined thickness of both halves of the sheet 20.

OPERATION OF PROFILE CONTROL EMBODIMENT

The gauge heads 36 and 38 are driven back and forth in vertical alignment across the sheet 20 by means of a traversing motor 46 under the direction of a speed control unit 48. The gauge 30 measures an area of finite dimension depending primarily on the size of the detector used. The portion of the sheet measured by the gauge 30 is represented by the shaded area or track 49. Since the gauge 30 scans at the speed of the rotating variations, the track 49 follows the heavy streak 17 in a parallel path. The gauge 30 eventually scans across the streak 17 as indicated at the intersection of the two shaded areas. Therefore, the thickness of streak 17 and any other variation rotating around the sheet will be measured by my system once and only once during any one complete forward scan of the sheet 20 by my gauge 30.

It may be appreciated that if the gauge 30 is to track in synchronism with the rotating variations, its scanning speed $v_s$ must be made proportional to the width $w$ of the sheet 20. For example, if the bubble diameter expands, the thickness variations speed up since they must travel around the sheet 20 in the same time (assuming the die or air ring rotation time is constant). Mathematically, the variations travel around the sheet 20 at a process velocity $$v_p = 2w/\tau \qquad (1)$$

Velocity $v_p$ is the lateral cross-sheet speed of, say the thick streak 17. A width gauge 50 (FIG. 1) and computer 52 provide in accordance with Equation 1 a signal on line 54 proportional to the velocity $v_p$. A scanning speed controller 56 adjusts speed control unit 48 to maintain the scanning velocity $$v_s \equiv v_p \qquad (2)$$

The construction of the width gauge (FIG. 4) may take many forms but the simplest may comprise a pair of pneumatic sheet edge detectors 58 and 60 made laterally movable across the width of the sheet 20 by means of a servo positioning unit 62. The servo positioning unit 62 receives signals from the detectors 58 and 60 whenever they are not located exactly at the edges of the sheet 20. Should the width $w$ change, an error signal causes a servomotor 64 to reposition the detectors 58, 60 along guide rods 66 by means of a lead screw 68. A repeat slidewire in the speed computer 52 can be mechanically coupled as represented by the dotted line 70 to the lead screw 68 to transmit the angular position of the lead screw 68 which is a function of the width $w$ of the sheet 20.

With the gauge speed controlled as indicated hereinabove, the recorder 34 will record the single thickness profile as indicated on a section of chart 72 (FIG. 1). The horizontal scale may be calibrated in units of angular displacement, such as degrees, around the bubble. It may be further desirable to correlate a point on the horizontal readout axis with a particular die or air ring segment. This can be done by mounting an indexing arm 74 on the die 14 at say die segment #1, to engage a limit switch 76 once every revolution. Limit switch 76 pulses recorder 34 to start recording after a suitable delay time provided by unit 78 to account for the time required for the area controlled by die segment #1, to reach the location of gauge 30. In this manner the thickness being read out at 0° will be that directly under the influence of die segment #1. A similar correlation can be made with the segmental jets of the rotating air ring or any other form of thickness adjustment. Recorder 34 may be provided with a polar chart readout. Either type of display facilitates adjustment of the film thickness profile.

It should be pointed out that one may read out either die profile or air ring profile if either element is rotated, provided the other is fixed and producing minimal thickness variations in the film. However, if the air ring 15 is rotating and providing rotating variations in the sheet while the die is fixed but cocked to streak the sheet longitudinally, it is not generally possible with this embodiment, to separate the two effects because the scanning gauge 30 will see the longitudinal streaks as well as the rotating thickness bands. Moreover, if both elements are rotating either in the same or in the opposite sense, it is again generally not readily possible to separate the two rotating profiles. One element must be stopped during the measurement period to study the profile of the rotating member.

STATIONARY PROFILE GAUGING EMBODIMENT

Longitudinally extending streaks such as indicated by the shaded area 61 may be determined in the following manner:

My scanning gauge 30 will measure in $\tau/2$ seconds, the total profile, i.e. both the rotating as well as the fixed thickness variations around the sheet 20. A gauge fixedly positioned at the edge of the sheet 20 for $\tau$ seconds (according to the Palmer application supra) will measure only the rotating thickness variations. I propose to compute the difference between the two measurements. Any difference between the two measurements will indicate one or more stationary thickness bands extending down the sheet.

Figure 5:
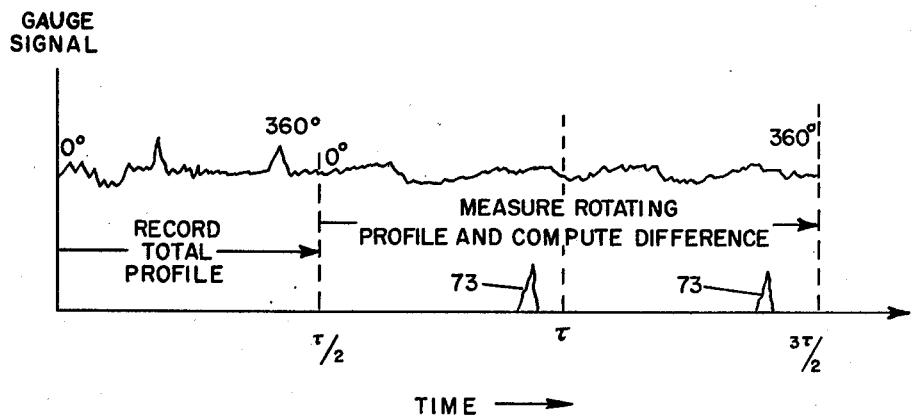
FIGURE 5 is a graph illustrating the effect of non-rotating thickness bands on my scanning gauge.
Figure 6:
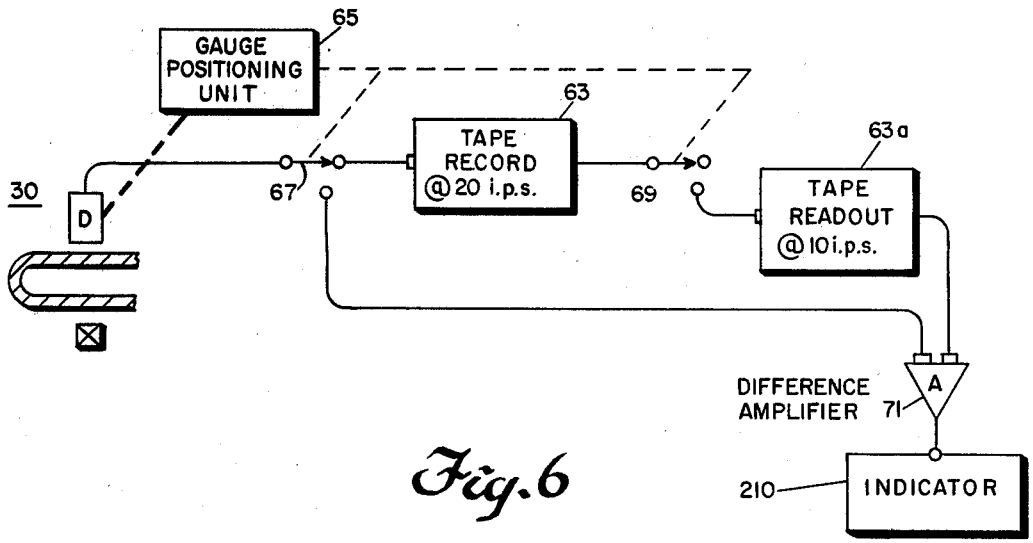
FIGURE 6 is a diagrammatic view of an alternative embodiment of my invention for determining the presence of non-rotating gauge bands.

Specifically, referring now to FIGS. 5 and 6, I use a single gauge 30 for both the scanning and the edge-of-the sheet measurements and a signal storage device such as a tape recorder 63 for storing signals from the gauge 30 during the $\tau/2$ seconds required to scan the sheet. A gauge positioning unit 65 directs the gauge to scan the sheet 20 and to dwell at the far edge thereof for at least $\tau$ seconds to complete the rotating profile measurement. Unit 65 also controls switches 67 and 69 that couple signals into and out of the tape recorder unit 63. When gauge 30 reaches the edge of the sheet, it will stop. Switches 67 and 69 connect the gauge 30 and a tape readout unit 63a to the input of a difference amplifier 71 respectively. The tape is read out and the stored signal is released at one-half of the speed used for recording since it takes twice as long to determine the rotating profile as it does to obtain the total profile with my novel system. The released tape signals and the edge-of-the-sheet gauge signals can then be compared on the same time base. Any difference between the two signals, occurring between times $\tau/2$ and $3\tau/2$, such as indicated by the pulses 73 (FIG. 5), is registered on indicator 210 to indicate the presence of nonrotating gauge bands.

It may be more desirable to store the rotating profile and read it out against the measured total profile. Implementation of this alternative will be obvious to those skilled in the art.

CONSTRUCTION OF MY AVERAGE CONTROL EMBODIMENTS

In accordance with this aspect of my invention, I position one or more gauges across the sheet 20. Each gauge divides the perimeter of the sheet into sections of substantially equal length. I then integrate each of my gauge measurements for a period of time depending on what fraction of the total sheet each gauge is measuring.

Figure 7A:
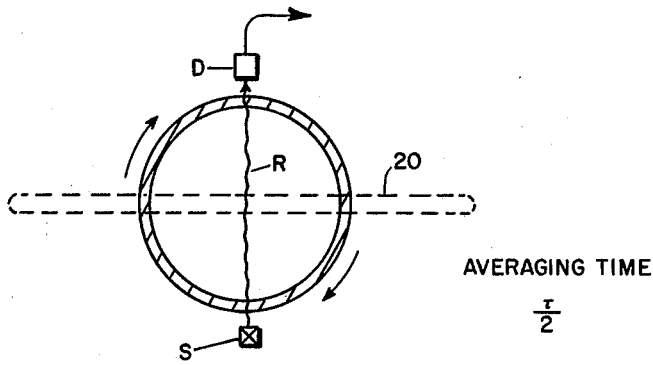
FIGURE 7(a) is a diagrammatic view of one embodiment of my average thickness measuring system.
Figure 7B:
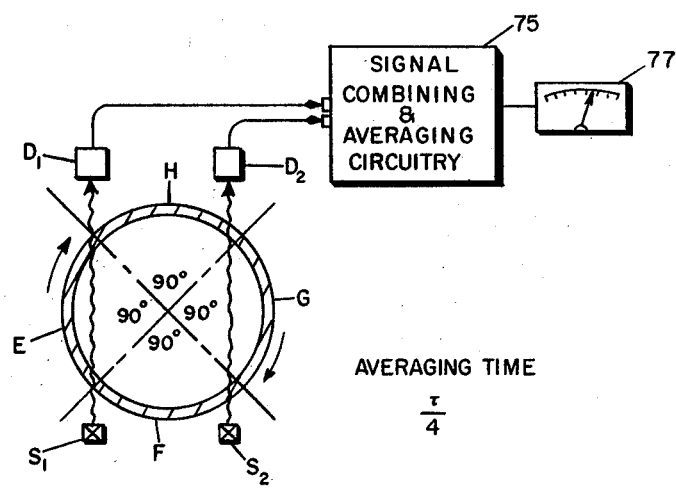
FIGURE 7(b) is a diagrammatic view of an alternative embodiment of my average thickness measuring system.
Figure 7C:
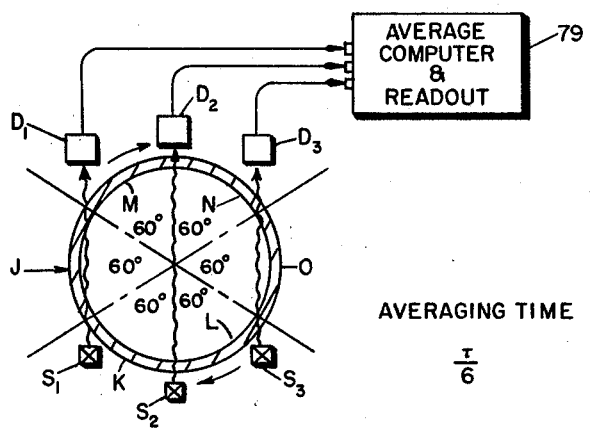
FIGURE 7(c) is a diagrammatic view of an alternative embodiment of my average thickness measuring system.

For example, referring to FIGS. 7(a), 7(b), and 7(c), my preferred gauge 30 may be simply represented by a source of radiation S and a detector D receiving radiation R transmitted through the sheet 20. The sheet 20 is shown opened up into a circle for purposes of simplifying the geometrical considerations to be taken up hereinafter. In FIG. 7(a), I make a diametric measurement that divides the perimeter of the sheet 20 into two sections. By keeping the gauge fixed, all thickness variations in the sheet 20 rotating in a clockwise direction, pass between or past the source and detector units, S and D, in one-half revolution of the rotating variations, which corresponds to $\tau/2$ seconds. Therefore, by integrating the measurements of this gauge over this period of time, I obtain an average thickness of the entire sheet 20. I can obtain an average in less time than this by employing two gauges (see FIG. 7(b)) having source detector units $S_1$–$D_1$ and $S_2$–$D_2$, respectively. The gauges are spaced to divide the sheet perimeter into four arcs E, F, G, and H of equal length. It may be observed that, in one-quarter of a revolution of the thickness variations, the double-thickness of arcs E and F are measured by one gauge and the double-thickness of arcs G and H are measured by the second gauge. Therefore, the signals from detectors $D_1$ and $D_2$ can be electronically combined by a unit 75 to yield the average thickness of the entire sheet in even less time than that required by the single gauge system of FIG. 7(a). For example, a desired target signal can be subtracted from each gauge signal and the deviation resulting from each subtraction can then be added together and an average computed of the resultant sum. A meter 77 may be used to read out this computed average thickness. It may be observed that in some extrusion lines where the rotation time may be 8 minutes an average sheet value may be provided by my system every two minutes. The access time may be reduced further by using three source detector units $S_1$–$D_1$, $S_2$–$D_2$, and $S_3$–$D_3$ as shown in FIG. 7(c). These gauges are spaced to divide the sheet 20 into 6 equal arcs, J, K, L, M, N and O. From the foregoing it may be seen that source-detector $S_1$–$D_1$ measures the double thickness of arcs J and K during one one-sixth of the revolution of the thickness variations. In the same period of time, source-detector $S_2$–$D_2$ and $S_3$–$D_3$ measures arcs L and M, and N and O, respectively. Therefore, for the above extruder, this system with a computer and readout unit 79 will provide an average thickness indication in 80 seconds. Additional gauges can be employed but eventually the cost of these units and the associated computational hardware offsets any economic advantages that might result from their utilization. While only the embodiment shown in FIG. 7(a) is discussed in detail hereinafter it is believed that the embodiments of FIGS. 7(b) and 7(c) may be constructed by one skilled in the art having the benefit of the above brief disclosure.

Figure 8:
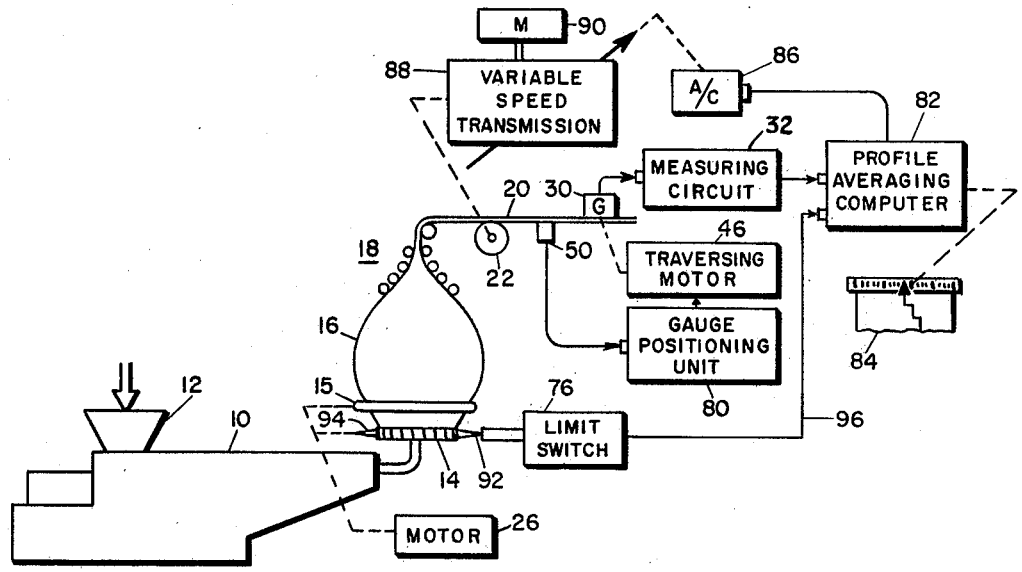
FIGURE 8 is a diagrammatic view showing a control system constructed in accordance with the embodiment shown in FIG. 7(a).

Referring now to FIG. 8, I provide a gauge positioning unit 80 that keeps the gauge 30 substantially in the center of the sheet 20. The center positioning device can be energized by signals from the width gauge 50 or it can simply be a modification of the width gauge construction shown in FIG. 4. It will be appreciated that slight off-center positioning of the gauge 30 can be accommodated without seriously affecting the derived half-cycle average.

The output of gauge 30 is amplified by the measuring circuit 32 and coupled to a profile averaging computer 82 that develops a signal proportional to the average of the measured thickness variations. The computed average thickness value may be read out on a chart 84 or used to control either the take-away speed of the process or the speed of the extruder screw. For this purpose, an automatic controller 86 adjusts a variable speed transmission 88 through which a main motor 90 drives the take-away roll 22 or, in some cases, the extruder screw. The profile averaging computer 82 may utilize one or more electronic integrators that average the signal from the measuring circuit 32 for the required $\tau/2$ time period. An average value can be computed for every half-cycle rotation of the extruding members by providing a pair of pins 92 and 94 extending from diametrically opposite sides of say, the die 14. As the die 14 rotates, the pins actuate limit switch 76 every half revolution which pulses the profile averaging computer 82 over line 96. This input to the computer 82 may serve to read out and reset one of the integrators in the computer 82, enabling another integrator to receive thickness data for averaging. Reference may be had to U.S. Patent 3,007,052, issued Oct. 31, 1961 to R. W. Hickman et al. Other types of integrator reset devices such as electronic timers may be employed in my invention with substantially equal utility.

Should a two or a three gauge system be desired, such as those illustrated in FIGS. 7(b) and 7(c), it will be necessary to provide gauge positioning apparatus that not only maintains the required spacing between the multiple gauges, regardless of changes in sheet width, but also preserves their symmetry about the center of the sheet 20. For example, in the three gauge system (FIG. 7b) one gauge is positioned in the center of the sheet 20 and each of the other gauges is spaced a distance therefrom determined in accordance with the following equation:

$$\text{Gauge spacing} = \frac{\text{Perimeter}}{6} = \frac{2w}{6} = \frac{w}{3} \qquad (3)$$

OPERATION OF AVERAGE CONTROL EMBODIMENT

Taking the case where both the air ring 15 and the die 14 are rotating at the same speed, in either the same or opposite sense, my gauge 30 will respond to and measure the double thickness of the sheet 20. If the period required for one cycle is, say 480 seconds, the double thickness is averaged by computer 82 for 240 seconds and read out on chart 84. If the computer average thickness is somewhat greater than a desired or target value, automatic controller 86 will increase the rate of take-away by increasing the speed of roll 22. This control action effectively stretches the film and causes an overall decrease in the thickness of the sheet 20. Of course, if an average thickness less than that desired is computed, the speed of roll 22 is decreased. Should the die 14 be fixed with respect to the bubble 16, and slightly out of adjustment, streaks will run longitudinally of the sheet and will, and of course, not be detectable by my stationary gauge 30. The average computed by computer 82 then will not be the average of the entire sheet, but only the average of those rotating variations such as streak 17.

My system will, nevertheless, greatly improve the overall thickness uniformity of the sheet 20 and provide average thickness data in a fraction of the time of systems now in use. The use of two integrators in the computer 82, with each on a time-sharing operation basis, will provide continuous half-cycle averages of the entire production of the extrusion process. Control of the process by means of my multiple gauge embodiments will be apparent to those skilled in the art.

In summary, any of my measuring and control embodiments may be applied to a blown film line for the purpose of increasing the throughput of uniform plastic film. In one case, a profile of high resolution is obtained yielding data primarily for the purpose of manual leveling of the thickness variations and a non-rotating profile can be separated from a rotating one. In the second case, an accurate sheet average is obtained primarily for the purpose of automatic control. Product uniformity is attained at a minimum of expense to the line operator.

While my invention has been described in connection with one or more preferred embodiments thereof, such description is intended to be merely exemplary in that numerous changes, omissions, and substitutions may be made to the illustrated system without detracting from the true spirit and scope of the present invention or sacrificing any of the advantages attendant thereto.

I claim:

1. The method of measuring a characteristic property of a tubular product formed by a rotatable member and flattened to form a sheet of double thickness, said method comprising the steps of:
    scanning across said sheet at a speed proportional to the angular velocity of said rotatable member to provide a first signal that is a function of the variations in said property around said entire sheet, and
    utilizing said signal to provide an indication of said property variations.

2. The method of measuring a characteristic property of a tubular product formed by a rotatable member and flattened to form a sheet of double thickness, said method comprising the steps of:
    measuring the width of said sheet,
    scanning in one direction across said sheet at a speed proportional to the angular velocity of said rotatable member and to the measured width of said sheet to provide a signal proportional to the variations in said property around said entire sheet, and
    utilizing said signal to provide an indication of said property variations.

3. Apparatus for measuring a characteristic property of a tubular product formed by a rotatable member and flattened to form a sheet of double thickness, said apparatus comprising:
    radiation gauge means for measuring the combined value of said property for both of said sheet thicknesses in a defined measuring area,
    means for moving said radiation gauge means across said sheet at a speed proportional to the angular velocity of said rotatable member to provide a first signal proportional to variations in said property around said sheet,
    and means for utilizing said signal to provide an indication of said property variations.

4. In combination with a blown film extruder including a forming member rotating at a predetermined angular velocity and a plurality of pinch roll means for flattening said tubular product into a sheet of double thickness, the improvement comprising:
    a nuclear radiation gauge including
        a source directing a beam of radiation into said sheet, and
        a detector receiving radiation interacting with said sheet for providing a signal proportional to the combined thickness of both of said sheet thicknesses in the region of said radiation interaction,
    traversing means for moving said radiation gauge in one direction across said sheet at a speed proportional to the angular velocity of said rotatable forming member,
        said detector signal being indicative of the variations in said thickness variations around said sheet, and
    means for utilizing said detector signal to provide an indication of the single-thickness profile of said tubular product.

5. In combination with a blown film extruder including a forming member rotating at a predetermined angular velocity for providing an expanded tubular product and a plurality of pinch roller means for flattening said tubular product into a sheet of double thickness having a width proportional to the diameter of said tubular product, the improvement comprising:
    a radiation transmission gauge including
        a source directing a beam of radiation through said sheet, and
        a detector receiving said beam of radiation directed through said sheet for providing a signal proportional to the combined thickness of both sides of said sheet,
    means for measuring the width of said flattened sheet, and
    means for moving said radiation transmission gauge in one direction across said sheet width at a speed proportional to the product of said measured width of said sheet and the angular velocity of said forming member to provide a signal proportional to the single thickness profile of said sheet.

6. In combination with a blown film extruder including a forming member rotating at a predetermined angular velocity for providing an expanded tubular product and a plurality of pinch roller means for flattening said tubular product into a flat sheet of double thickness having a width proportional to the diameter of said tubular product, the improvement comprising:
    a radiation transmission gauge including
        a source directing a beam of radiation through said sheet, and
        a detector receiving said beam of radiation directed through said sheet for providing a signal proportional to the combined thickness of both sides of said flat sheet,
    means for measuring the width of said flattened sheet,
    means for moving said radiation in one direction across said sheet at a speed proportional to the product of said measured width thereof and the angular velocity of said forming member,
        said signal varying first in accordance with the thickness variations around said sheet,
    means for utilizing said signal resulting from said cross-sheet gauge movement to provide an indication of the thickness profile of said tubular product.

7. Apparatus for determining the thickness profile of a tubular film product extruded by a revolving die member rotatably mounted for rotation at a substantially constant angular velocity to spread thickness variations spirally about said tubular product, said extruded tubular product being flattened to produce a sheet of double thickness having a width proportional to the diameter of said tubular product, said apparatus comprising:
    radiation gauge means including
        a source of radiation directed into said sheet, and
        a detector spaced from said source for receiving radiation passing through said sheet and generating a signal proportional to the amount of said received radiation,
    means for positioning said radiation gauge means across said sheet whereby said generated signal is proportional to the combined thickness of both thicknesses of said sheet,
    scanning controller means coupled to said gauge positioning means for moving said radiation gauge means across said sheet at a speed proportional to said angular velocity of said revolving die member to provide a first signal proportional to the thickness variations around said sheet,
    means for detecting the relative angular orientation of said revolving die member,
    means for measuring the transport time of said film product from said die member to said gauge position, means responsive to said die orientation and said product transport time for correlating said gauge thickness measurement with the angular position of said die member, and recorder means for visually presenting said correlated thickness variations.

8. Apparatus for determining the average value of a characteristic property of a tubular product extruded from a rotatable die member and flattened to form a sheet of double thickness having a perimeter proportional to the width of said sheet, said apparatus comprising:

means for measuring the double thickness value of said property at least one location across said sheet width to divide said perimeter into sections of substantially equal length, means for combining said property measurements, means for integrating said combined measurement over a period of time proportional to the length of said perimeter sections, and means for utilizing said integrated measurement.

9. Apparatus for determining the average value of a characteristic property of a tubular product extruded from a rotatable die member and flattened to form a sheet of double thickness having a perimeter proportional to the width of said sheet, said apparatus comprising:

radiation gauge means for measuring the double thickness of said sheet at a plurality of locations across said sheet width to divide said perimeter into sections of substantially equal length, means for combining said radiation gauge measurements, computer means for integrating said combined radiation gauge measurements over a period of time proportional to the length of said perimeter sections, and means for utilizing said integrated measurement.

10. Apparatus for determining the average value of a characteristic property of a tubular product extruded from a rotatable die member and flattened to form a substantially flat sheet of double thickness, said apparatus comprising:

means positioned midway between the edges of said sheet to measure the combined value of said characteristic property of both thicknesses of said sheet, and means for averaging said property measurement over a time period equal to an integral multiple, of one-half the rotation period of said rotating die member.

11. The method of measuring a characteristic property of a tubular product formed by a rotatable die member and flattened to form a sheet of double thickness, said method comprising the steps of:

measuring substantialy in the middle of said sheet to determine the combined value of said characteristic property for both thicknesses of said sheet, and averaging said measurement over a time period equal to an integral multiple, of substantially one-half the rotation period of said rotating die member.

12. The method of measuring a characteristic property of tubular product formed by a rotatable member and flattened to form a sheet of double thickness, said method comprising the steps of:

continuously measuring in the middle of said sheet to determine the combined value of said characteristic property for both thicknesses of said sheet, averaging said continuous measurement over a period of time equal to an integral multiple of substantially one-half of the period of rotation of said rotatable member, and utilizing said time averaged measurement.

13. The method of controlling the thickness of a tubular product formed by a rotatable member and flattened to form a sheet of double thickness, said method comprising the steps of:

measuring the combined thickness of both thicknesses of said sheet at the center thereof, measuring the period of rotation of said rotatable member, computing the average value of said measured thickness over a period of time determined in accordance with said measured period of rotation, and controlling a parameter of said process in accordance with said computed average thickness value.

14. In combination with a blown film extruder including a rotatable member rotating at a predetermined angular velocity for providing an expanded tubular product and a plurality of pinch roller means for flattening said tubular product into a sheet of double thickness having a width proportional to the diameter of said tubular product, the improvement comprising:

a radiation gauge including a source directing a beam of radiation into said sheet substantially at the middle thereof and a detector receiving radiation interacting with said sheet for providing a signal proportional to the combined thickness of both thicknesses of said sheet, means for maintaining said gauge at a position across said width substantially equally distant from either edge of said sheet, and means for computing the average value of said signal over a period of time that is substantially equal to one-half the rotation period of said rotatable member.

15. In combination with a blown film extruder including an orifice member rotating at a predetermined angular velocity for providing an expanded tubular product and a plurality of pinch roller means for flattening said tubular product into a sheet having a width proportional to the diameter of said tubular product, the improvement comprising:

a radiation transmission gauge including a source directing a beam of radiation through said sheet and a detector receiving said beam of radiation directed through said sheet for providing a signal proportional to the combined thickness of both sides of said flat sheet, means for continuously positioning said gauge across said width at a position substantially equally distant from both edges of said sheet, means computing the average value of said signal over a period of time that is an integral multiple of one-half the time of rotation of said orifice member, and means for ultilizing said computed average value of said signal.

16. In combination with a blown film extruder including an orifice member rotating at a predetermined angular velocity for providing an expanded tubular product and means for conveying said product at an adjustable speed through a plurality of pinch roller means for flattening said tubular product into a sheet of double thickness having a width proportional to the diameter of said tubular product, the improvement comprising:

a radiation transmission gauge including a source directing a beam of radiation through said sheet and a detector receiving said beam of radiation directed through said sheet for providing a signal proportional to the combined thickness of both sides of said sheet, means for continuously positioning said gauge across said width at a position equally distant from both edges of said sheet, means for continuously positioning said gauge across said width at a position equally distant from both edges of said sheet, means for computing the average value of said signal over a period of time that is substantially equal to one-half the time of rotation of said orifice member, and means for controlling the speed of said conveying means in accordance with the computed average value of said signal to maintain the thickness of said double-thick sheet substantially uniform.

17. In combination with a blown film extruder including an orifice member rotating at a predetermined angular velocity for providing an expanded tubular product, adjustable take-away means for said product and a plurality of pinch roller means for flattening said tubular product into a sheet of double thickness having a width proportional to the diameter of said tubular product, the improvement comprising:

a radiation transmission gauge including
   a source directing a beam of radiation through said sheet and
   a detector receiving said beam of radiation directed through said sheet for providing a signal proportional to the combined thickness of both sides of said sheet,
means for measuring the width of said sheet,
means responsive to said measured width for continuously positioning said gauge across said sheet at a location substantially equally distant from both edges of said sheet,
means for computing the average value of said signal over a period of time that is equal to one-half the time of rotation of said orifice member, and
means for adjusting the take-away speed of said product from said rotatable member in accordance width the computed value of said average for said sheet.

18. The method of determining the presence of one or more stationary thickness bands extending longitudinally of a sheet formed by flattening tubular blown film extruded from a die having a rotating forming member, said method comprising the steps of:

measuring the total thickness profile around said sheet,
measuring only the rotating thickness profile of said sheet,
comparing said measurements to determine any difference between said profile measurements, and
utilizing said difference measurement to locate a stationary thickness band in said sheet.

19. Apparatus for determining the presence of one or more stationary thickness bands extending longitudinally of a sheet formed by flattening tubular blown film extruded from a die having a rotating forming member, said apparatus comprising:

radiation gauge means for measuring the double thickness of said sheet,
means for moving said radiating gauge across said sheet at a speed proportional to the angular velocity of said rotating forming member to provide a first signal proportional to the total thickness variations occurring around said sheet,
means for maintaining said radiation gauge means at one edge of said sheet for one revolution of said forming member to provide a second signal proportional to the rotating thickness variations of said sheet,
means for storing one of said signals at one rate and releasing said signal at a different rate,
means for combining the other of said signals with said released signal to compute any difference between said total and said rotating thickness variations, and
means for utilizing said computed thickness difference.

20. Apparatus for determining the average value of a characteristic property of a tubular product having spiral variations around the circumference and flattened to form a sheet of double thickness having a perimeter proportional to the width of said sheet, said apparatus comprising:

means for measuring the double thickness value of said property at a plurality of locations across said sheet width to divide said perimeter into sections of substantially equal length,
means for combining and integrating said property measurements over a period of time proportional to the length of said perimeter sections, and
means for utilizing said integrated property measurements.

21. The method of measuring thickness variations of a tubular product formed by a member which rotates to distribute the thickness variations circumferentially around the product, said product being flattened to form a sheet of double thickness, said method comprising the steps of:

scanning a thickness measuring device across said double thickness sheet at a speed related to the angular velocity of said rotatable member such that the movement of the thickness variations on one half of said sheet remain fixed relative to the measuring device to provide a signal which is a function of the variations in thickness around said sheet, and
utilizing said signal to provide an indication of said thickness variations.

22. Apparatus for measuring thickness variations in a tubular product formed by a rotatable member which distributes thickness variations circumferentially around the product, said product being flattened to form a sheet of double thickness, said apparatus comprising:

gauge means for measuring the combined value of both of said sheet thicknesses in a defined measuring area;
means for moving said gauge means across said double thickness sheet at a speed related to the angular velocity of said rotatable member such that the thickness variations on one half of said sheet remains fixed relative to said gauge means to provide a first signal representative of the variations in thickness around said sheet;
and means for utilizing said signal to provide an indication of said thickness variations.

23. The apparatus of claim 22 wherein said gauge means is a radiation gauge which includes a source of radiation and a detector spaced from said source for receiving radiation passing through the sheet and for generating a signal representing the amount of said received radiation.

24. The apparatus of claim 22 further including means for measuring the width of said flattened sheet, and wherein said moving means is arranged to move said gauge across the sheet at a speed proportional to the product of the measured width of the sheet and the angular velocity of the rotatable member.

25. The apparatus of claim 22 further including means for detecting the angular orientation of the rotatable member relative to a datum position;
means for measuring the transport time of said sheet from the rotatable member to said gauge position;
means responsive to the orientation of said rotatable member and said sheet transport time for correlating said gauge thickness measurement with the angular position of said rotatable member; and
a recorder for visually presenting said correlated thickness variations.

26. The apparatus of claim 22 in which said moving means is arranged to move said gauge across the flattened sheet during a first period equal to half the time taken for the rotatable member to complete one revolution thereof and to stop the movement of said gauge when it reaches the edge of the sheet for a second period equal to the time taken for one revolution of the rotatable member; said apparatus further including means for storing the signals produced by said gauge during said first period;

means for reading out said stored signals at half the speed at which they are recorded; and means for comparing the readout signals with the signals provided by the gauge during said second period to provide an output representing variations in the thickness of the sheet parallel to the direction of movement thereof.

27. The apparatus of claim 26 further including means for measuring the width of said flattened sheet, and wherein said moving means is arranged to move said gauge across the sheet at a speed proportional to the product of the measured width of the sheet and the angular velocity of the rotatable member.

28. Apparatus for determining the average value of the thickness of a tubular product formed by a rotatable member which distributes thickness variations circumferentially around the product, said product being flattened to form a sheet of double thickness having a perimeter proportional to the width of said sheet, said apparatus comprising:
   means for measuring the double thickness value of said product at at least one location across said sheet width to divide said perimeter into sections of substantially equal length,
   means for combining said thickness measurements,
   means for integrating said combined measurement over a period of time equal to that required for the thickness variations in one perimeter section to move past a corresponding one of said measuring means, and
   means for utilizing said integrated measurement.

29. The apparatus of claim 28 wherein a single measuring means is positioned at the center of said sheet and wherein said integrating means averages the measurements made by said measuring means over a time period equal to one half the time it takes for said rotatable member to make one revolution.

30. The apparatus of claim 28 wherein said measuring means includes a plurality of thickness gauges which divide the periphery of the sheet into substantially equal lengths and wherein said integrating means averages said measurements over a time period substantially equal to one revolution of the rotatable member divided by twice the number of thickness gauges employed to provide a total average value the thickness of the flattened sheet.

31. The apparatus defined in claim 28 further including means for monitoring the width of the flattened sheet, and means responsive to said monitoring means for maintaining said measuring means at positions relative to the sheet to divide the periphery of the sheet into substantially equal lengths.

32. A method of measuring the thickness of a sheet during production by a tubular product forming device having a rotatable member which distributes variations in thickness about the circumference of the tubular product, the product then being flattened to form a moving sheet of double thickness, the method comprising the steps of:
   moving a thickness gauge across the sheet during a first period equal to half the time taken for the rotatable member to complete one revolution thereof; said gauge moving at a speed proportional to the angular velocity of the rotatable member to provide signals representing the variations in the thickness of the sheet around its periphery,
   storing said signals derived from said gauge during said first period,
   stopping said gauge at the edge of the sheet for a second period equal to the time taken for one revolution of the rotatable member,
   reading out the stored signals at half the speed at which they are recorded,
   and comparing the readout signals with the signals provided by the gauge during said second period to provide an output signal representing variations in the thickness of the sheet parallel to the direction of movement thereof.

33. The method of claim 32 further including the steps of measuring the width of said flattened sheet and controlling the movement of said thickness gauge across said sheet such that said gauge moves at a speed proportional to the product of the measured width of the sheet and the angular velocity of the rotatable member.

34. The method of measuring the average thickness of a sheet during production by a tubular product forming device having a rotatable member which distributes variations in thickness about the circumference of the tubular product, the product then being flattened to form a moving sheet of double thickness, the method comprising the steps of:
   locating across the sheet at least one thickness gauge for measuring the combined thickness of the double thickness sheet such that the perimeter of said sheet is divided into sections of substantially equal length, and
   averaging the thickness measurements over a time period substantially equal to one revolution of the rotatable member divided by twice the number of gauges to provide a total average value of the thickness of the sheet.

35. The method as defined in claim 34 further including the step of monitoring the width of the flattened double thickness sheet to produce a signal for maintaining said gauge at a position relative to said sheet to divide the periphery of the sheet into substantially equal lengths.

References Cited
UNITED STATES PATENTS
3,368,007   2/1968   Palmer _____ 264—95 X ROBERT F. WHITE, Primary Examiner J. H. SILBAUGH, Assistant Examiner U.S. Cl. X.R.

18—2, 14; 250—83.3; 264—95